(12) United States Patent
Fugel et al.

(10) Patent No.: US 11,378,127 B2
(45) Date of Patent: Jul. 5, 2022

(54) AXIAL ROLLING BEARING

(71) Applicant: Schaeffler Technologies AG & Co. KG, Herzogenaurach (DE)

(72) Inventors: Wolfgang Fugel, Nuremberg (DE); Wolfram Kruhöffer, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/251,003

(22) PCT Filed: Jun. 6, 2019

(86) PCT No.: PCT/DE2019/100511
§ 371 (c)(1),
(2) Date: Dec. 10, 2020

(87) PCT Pub. No.: WO2020/001684
PCT Pub. Date: Jan. 2, 2020

(65) Prior Publication Data
US 2021/0254666 A1     Aug. 19, 2021

(30) Foreign Application Priority Data

Jun. 25, 2018     (DE) .................. 10 2018 115 182.9

(51) Int. Cl.
*F16C 33/58*     (2006.01)
*F16C 19/30*     (2006.01)
*F16C 19/46*     (2006.01)

(52) U.S. Cl.
CPC ............ *F16C 33/588* (2013.01); *F16C 19/30* (2013.01); *F16C 19/46* (2013.01)

(58) Field of Classification Search
CPC ........ F16C 19/30; F16C 19/305; F16C 19/46; F16C 19/463; F16C 33/583; F16C 33/585; F16C 33/586; F16C 33/588
See application file for complete search history.

(56) References Cited

U.S. PATENT DOCUMENTS

| 5,407,045 A | 4/1995 | Welter et al. |
| 5,975,763 A * | 11/1999 | Shattuck ................. F16C 19/30 384/450 |
| 2004/0105604 A1 * | 6/2004 | Fugel .................... F16C 33/588 384/620 |

FOREIGN PATENT DOCUMENTS

| CH | 225839 A | 2/1943 |
| CN | 101006282 A | 7/2007 |
| CN | 101371056 A | 2/2009 |
| CN | 205331233 U | 6/2016 |
| DE | 4227669 A1 | 9/1993 |
| DE | 199 24 018 A1 | 12/1999 |
| DE | 102005061102 A1 | 7/2007 |
| DE | 102010033122 A1 | 2/2012 |

(Continued)

*Primary Examiner* — James Pilkington

(57) ABSTRACT

An axial rolling bearing consisting of at least one annular bearing disc which has a circumferential raceway arched in profile cross section, and consisting of a multiplicity of rolling elements formed as bearing needles or bearing rollers and arranged next to one another in a circular form, which roll on the raceway of the bearing disc and are kept at uniform distances from one another by a bearing cage. The arched raceway is formed having at least one circumferential groove-shaped depression at least in the region of one of the two ends of the rolling elements.

11 Claims, 4 Drawing Sheets

(56) References Cited

FOREIGN PATENT DOCUMENTS

| | | |
|---|---|---|
| DE | 102010053140 A1 | 6/2012 |
| DE | 102014220826 A1 | 4/2016 |
| JP | H07119740 A | 5/1995 |
| JP | H11257348 A | 9/1999 |
| JP | 2006046560 A | 2/2006 |
| JP | 2007170448 A | 7/2007 |
| JP | 2011027213 A | 2/2011 |
| JP | 2011094716 A | 5/2011 |
| JP | 2012007709 A | 1/2012 |
| JP | 5621352 B2 | 11/2014 |

* cited by examiner

AXIAL ROLLING BEARING

CROSS-REFERENCE TO RELATED APPLICATIONS

This application is the U.S. National Phase of PCT Appln. No. PCT/DE2019/100511 filed Jun. 6, 2019, which claims priority to DE 10 2018 115 182.9 filed Jun. 25, 2018, the entire disclosures of which are incorporated by reference herein.

TECHNICAL FIELD

The disclosure relates to an axial rolling bearing which can be implemented particularly advantageously on an axial needle bearing or axial roller bearing.

BACKGROUND

From DE 10 2010 033 122 A1, an axial rolling bearing is known, the bearing discs of which are designed as load-dependent spring-loaded disc springs. The raceways are designed to be planar, but locally each have an arched section that is convex towards the rolling region, i.e., the arched sections of the two bearing discs are directed towards one another. This means that the rolling elements have low-friction, short contacts to the raceways in the unloaded or low-loaded state, wherein the arched sections become spring-loaded as the load increases, so that the contact length of the rolling elements increases.

Due to the short and therefore low-friction contact lengths between the rolling elements and the raceway regions of the bearing discs in the low-load range, the rolling elements can roll on the raceways in a kinematically favorable manner. As is the case with the previously usual unarched bearing discs, this also prevents the rolling elements in the almost load-free state from rolling from kinematically unclean rolling on the raceways up to a standstill of the rolling elements or of the entire rolling element ring, and the rolling elements slide only via the raceways. The deflection that begins with increasing load up to the complete deflection with a sufficiently high load results in a load-bearing length of the rolling contacts that increases with the bearing load, so that the load-bearing capacity of the bearing is always provided.

However, it has been found that, due to the elastic deformation behavior of the bearing discs, high bearing loads near the rolling element ends can lead to increased contact pressures with the respective raceway, which lead to an increase in friction and a reduction in bearing service life. Furthermore, the out-of-roundness of the rolling elements is particularly great near the ends of the rolling elements, so that these contact pressures are sometimes increased even further. In addition, this can also have an unfavorable effect on the development of noise in the bearing.

SUMMARY

On the basis of the disadvantages of the known prior art set out above, it is desirable to design an axial needle bearing or axial roller bearing which avoids the increased contact pressures of the rolling element ends with respect to the respective raceway resulting from the elastic deformation behavior of the bearing discs at high bearing loads, so that it is characterized by a reduction in friction and noise development, as well as an increase in bearing service life.

An axial rolling bearing includes an arched raceway formed with at least one circumferential groove-shaped depression at least in the region of one of the two ends of the rolling elements.

Preferred configurations and advantageous developments of the axial rolling bearing are described.

The arched raceway in the region of both ends of the rolling elements may be formed with groove-shaped depressions, the maximum depth of which is between 0.1% and 15% of the material thickness of the bearing disc. A depth of the groove-shaped depressions of between 0.2% and 10% of the material thickness of the bearing disc and a rounded profile cross section of the depressions have proven particularly suitable with regard to the stability and deflection behavior of the bearing disc.

In the outer groove-shaped depression the inner radius of the depression may correspond to the distance between the outer end face of the rolling elements and the axis of rotation of the axial rolling bearing minus a variable distance measure, wherein the distance measure is between 5% and 45% of the diameter of the rolling elements and relates to a central position of the rolling elements in the cage pockets thereof and to a central position of the bearing cage in the guide thereof on the bearing disc. The outer radius of the depression may correspond to the distance between the inner end face of the rolling elements and the axis of rotation of the axial rolling bearing plus a distance measure, the distance measure also being between 5% and 45% of the diameter of the rolling elements.

The width of the groove-shaped depressions in the arched raceway may be at least 5% of the diameter of the rolling elements and may be greater than the distance measure of between 5% and 45% of the diameter of the rolling elements. This is to ensure that even with axial play of the rolling elements within the cage pockets thereof and with guide play of the bearing cage on the bearing disc, undesired contact pressures are avoided in the region of the rolling element ends.

The transitions between the groove-shaped depressions and the arched raceway in the rolling region of the rolling elements may each have a rounded contour. This also ensures that undesired contact pressures between the rolling element ends and the raceway are reliably avoided.

The rolling elements in the region of the two ends thereof additionally may have a diameter-reducing transition profile from the outer surface thereof to the end faces thereof. This transition profile may be formed by a logarithmically sloping section in the profile cross section as well as by a rounded portion that adjoins same and ends at the end faces of the rolling elements. The transitions from the outer surfaces to the logarithmically sloping sections and from these to the rounded portions at the ends of the rolling elements may be edge-free, preferably with a constant curvature.

The axial rolling bearing may have two of the previously described bearing discs with groove-shaped depressions in the raceways thereof.

The roller bearing as described herein thus has an advantage over the prior art according to DE 10 2010 033 122 A1, where only one curvature protruding convexly from the running surface of the bearing disc is provided, such that in the bearing disc thereof two circumferential groove-shaped depressions are provided in the rolling element raceway in the region the needle or roller ends. This specific raceway or running surface geometry advantageously avoids excessive contact pressure near the rolling element ends when the bearing load is high, since the rolling element ends are exposed by the depressions in the raceway. While it has been found in known axial rolling bearings with arched raceways that when the central convex arched section is fully deflected, the bearing disc is elastically arched in the region of the rolling element ends, which can lead to significant contact pressure peaks at the rolling element ends, so that through the formation of groove-shaped raceway depressions adapted to the deflection behavior, these contact pressure peaks are excluded even under high loads. The one bearing disc or the two bearing discs of the axial rolling bearing are also completely deflected when the load is sufficiently high, while undesirable contact pressures in the region of the rolling element ends are avoided.

The design of the bearing discs with the two depressions and the thus achieved relaxation of the rolling element ends that can occur result in a more uniform course of the contact pressure over the length of the rolling element. The configuration leads to a reduction in friction and slip in the high load range and thus to a reduction in wear and an increase in service life. The axial rolling bearing also runs more smoothly and the stability of the running discs is increased by the depressions acting as reinforcing beads.

BRIEF DESCRIPTION OF THE DRAWINGS

A preferred embodiment of the axial rolling bearing is explained in more detail below with reference to the accompanying drawings. Therein.

DETAILED DESCRIPTION

Figure 1:
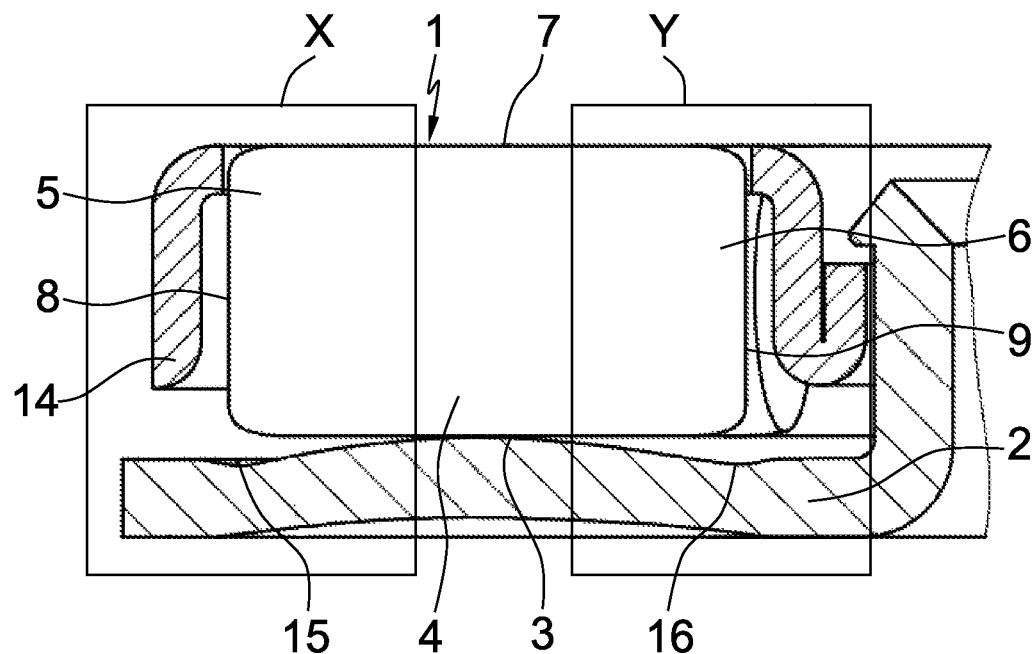
FIG. 1 shows a partial view of a cross section through an axial rolling bearing in the unloaded state.
Figure 2:
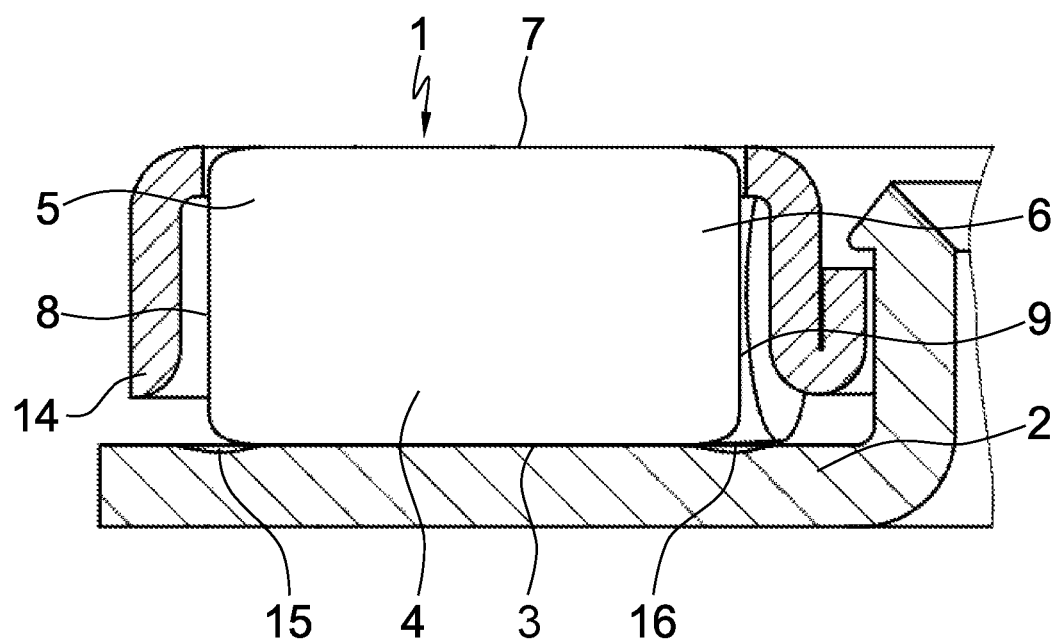
FIG. 2 shows the partial view of the cross section according to FIG. 1 of the axial rolling bearing in the loaded state.

From the FIGS. 1 and 2 emerges a corresponding axial rolling bearing 1 formed as an axial needle bearing, which consists of an annular bearing disc 2 as well as of a multiplicity rolling elements 4 formed as bearing needles and arranged side by side in a circular shape, which roll off on the arched raceway 3 of the bearing disc 2 and are held by a latching nose, not further specified, at a likewise not further specified rim-fixed bearing cage 14 at uniform distances from one another. In a clearly visible manner, the bearing disc 2 has a circumferential, in the profile cross section arched raceway 3, so that the rolling elements 4 of the axial rolling bearing 1 in the unloaded state shown in FIG. 1 lie only few and far between on the raceway 3, while the axial rolling bearing 1 in the loaded state shown in FIG. 2 lies almost over the entire length of the rolling elements 4 on the arched raceway 3.

To avoid increased contact pressure between the ends 5, 6 of the rolling elements 4 and the arched raceway 3 in such an axial rolling bearing at high bearing loads, the arched raceway 3, as can also be seen in FIGS. 1 and 2, in the region of the two ends 5, 6 of the rolling elements 4, has two circumferential groove-shaped depressions 15, 16 which are designed with a rounded profile cross section.

Figure 3:
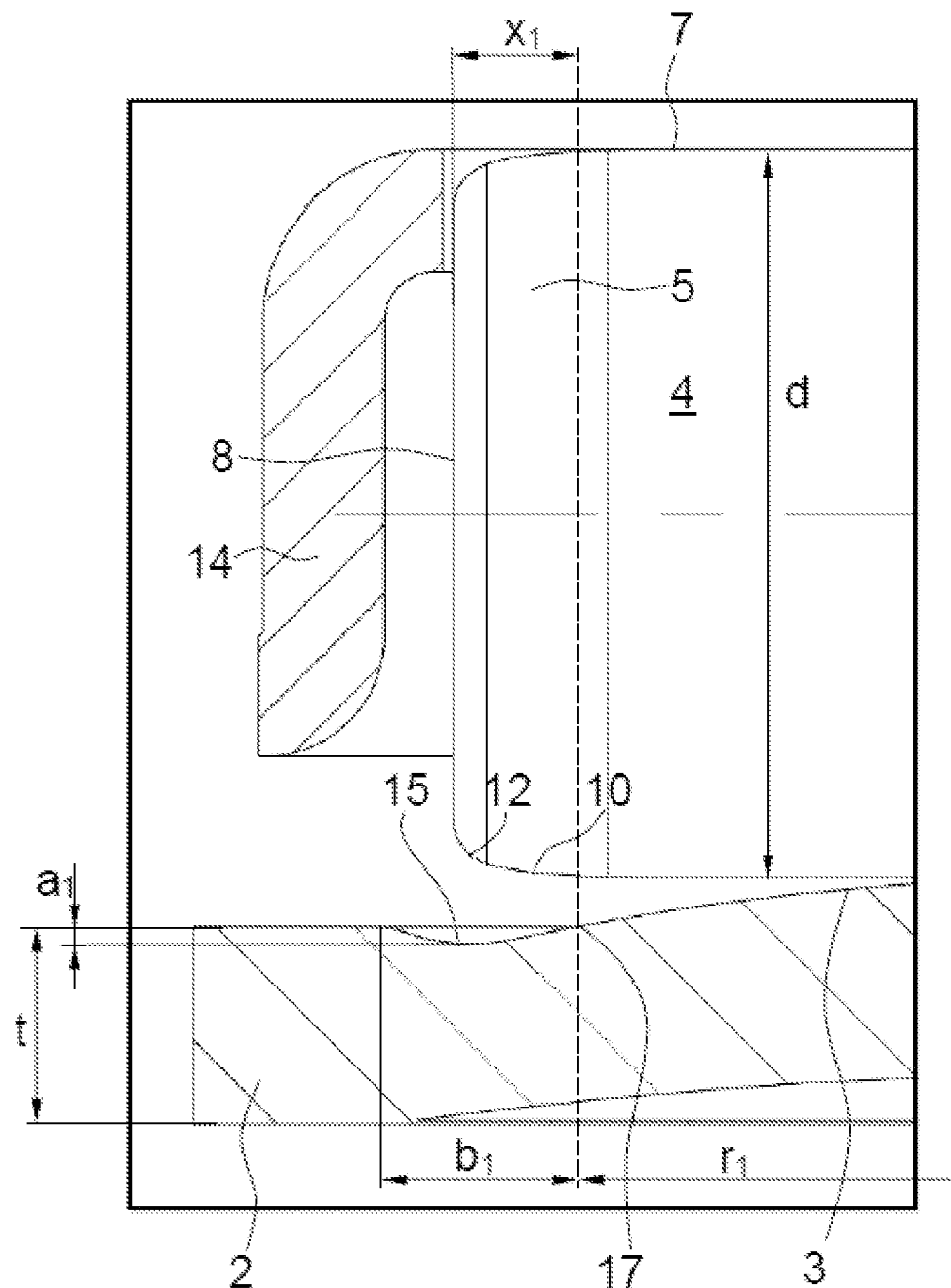
FIG. 3 shows an enlarged illustration of the detail X of the axial rolling bearing according to FIG. 1.
Figure 4:
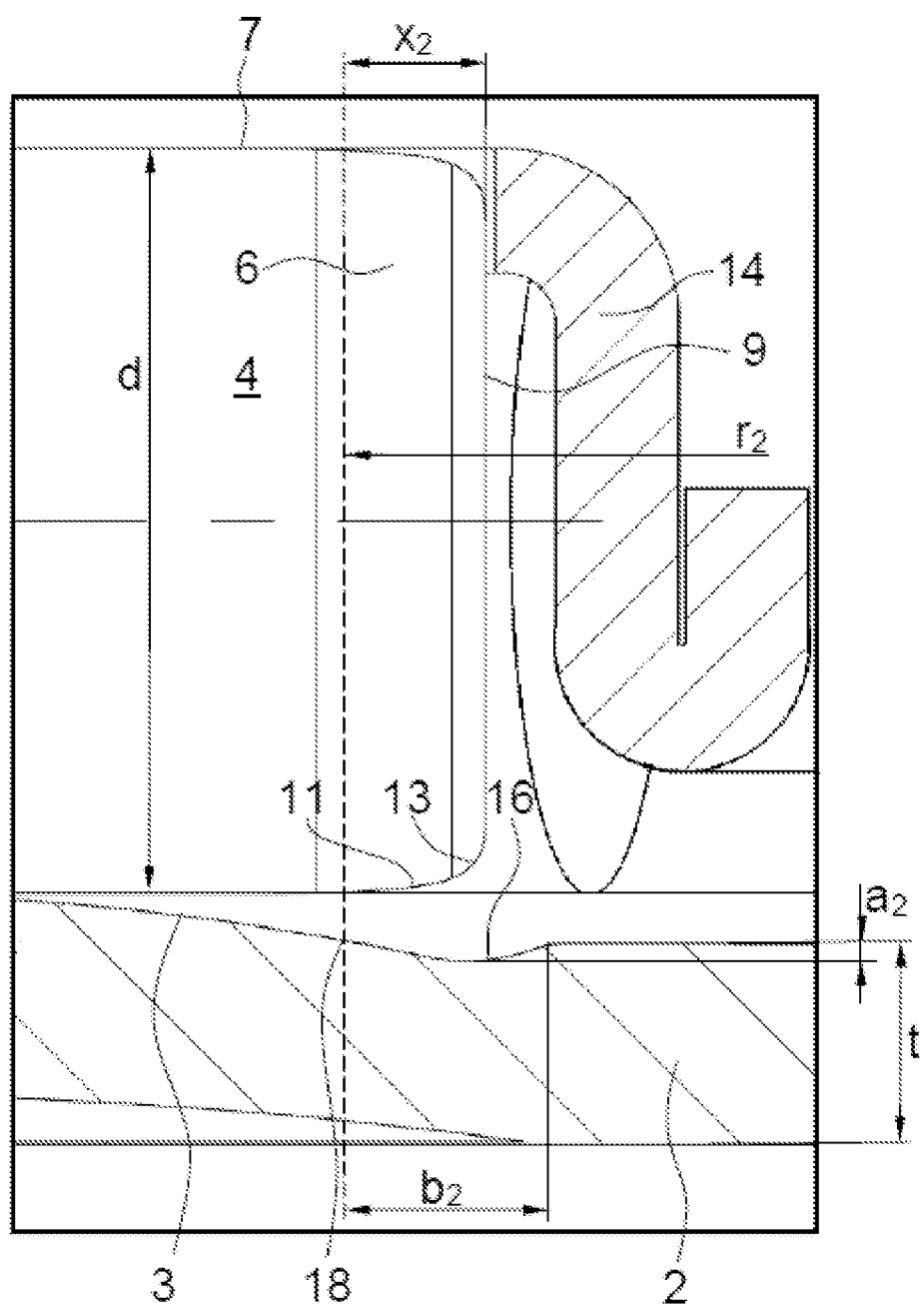
FIG. 4 shows an enlarged illustration of the detail Y of the axial rolling bearing according to FIGS. 1.

From the enlarged representations of the details X and Y marked in FIG. 1 according to FIGS. 3 and 4, it can be seen that the groove-shaped depressions 15, 16 in the arched raceway 3 have a maximum depth a1, a2 of between 0.1% and 15% of the material thickness t of the bearing disc 2, and that the width b1, b2 of the groove-shaped depressions 15, 16 is in each case at least 5% of the diameter d of the rolling elements 4.

The inner radius r1 of the outer groove-shaped depression 15 visible in FIG. 3 corresponds to the distance between the outer end face 8 of the rolling elements 4 and the rotational axis of the axial rolling bearing 1, which is not shown, minus a distance measure x1, which is between 5% and 45% of the diameter d of the rolling elements 4. The outer radius r2 of the inner groove-shaped depression 16 indicated in FIG. 4, however, corresponds to the distance of the inner end face 9 of the rolling elements 4 to the rotational axis of the axial rolling bearing 1, not shown in detail, plus a distance measure x2, which is also between 5% and 45% of the diameter d of rolling element 4. In both cases, the width b1, b2 of the groove-shaped depressions 15, 16 in the arched raceway 3, as shown, is greater than the distance measure x1, x2. In addition, it can be seen in FIGS. 3 and 4 that the transitions 17, 18 of the groove-shaped depressions 15, 16 to the arched raceway 3 in the rolling region of the rolling elements 4 each have a rounded contour.

Furthermore, it can be seen from FIGS. 3 and 4 that the rolling elements 4 in the region of the two ends 5, 6 thereof additionally have a transition profile, which reduces the diameter d thereof, of the outer surface 7 thereof to the end faces 8, 9 thereof. This transition profile at the ends 5, 6 of the rolling elements 4 is clearly visible in each case by a logarithmically sloping section 10, 11 in the profile cross section as well as an adjoining rounded portion 12, 13 which ends at the end faces 8, 9 of the rolling elements 4, whereby the transitions from the outer surfaces 7 to the logarithmically sloping sections 10, 11 and from these to the rounded portions 12, 13 at the ends 5, 6 of the rolling elements 4, are edge-free, preferably with a constant curvature.

Figure 5:
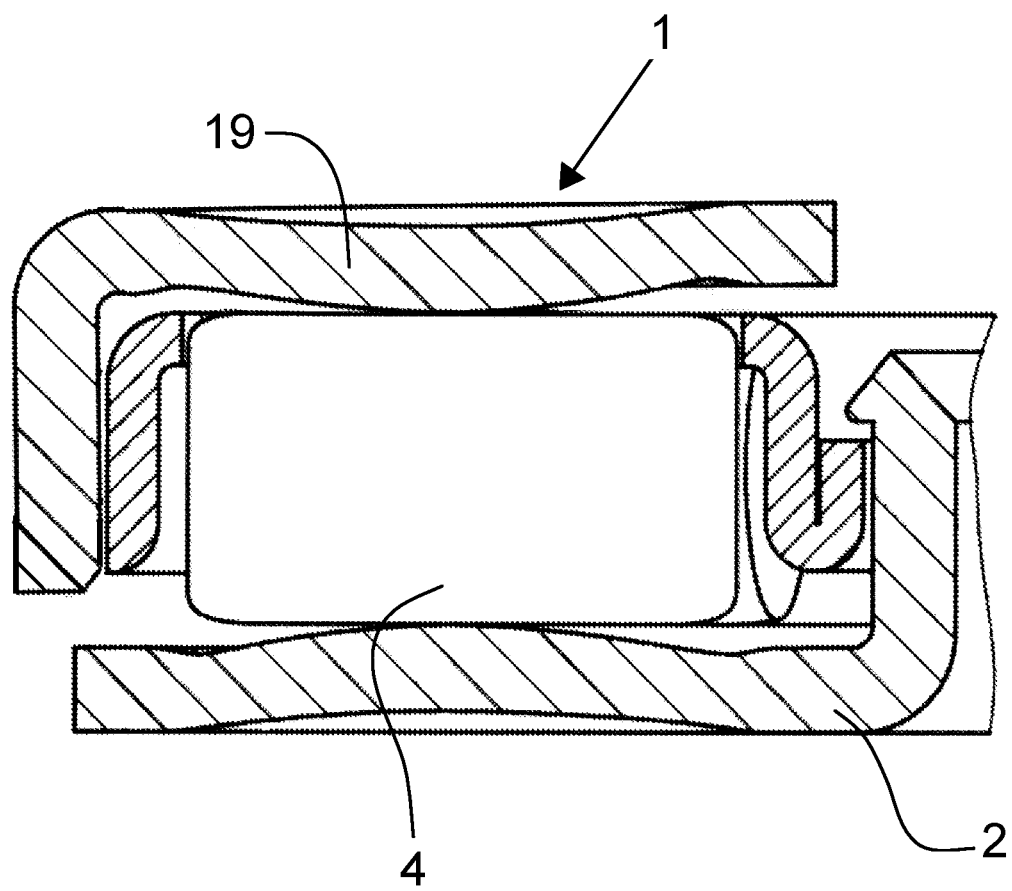
FIG. 5 shows the partial view of the cross section according to FIG. 1 of the axial rolling bearing having a second bearing disc in the unloaded state.

As can be seen in the embodiment shown in FIG. 5, axial bearing 1 includes rolling element 4 arranged between bearing disc 2 and second bearing disc 19.

LIST OF REFERENCE SYMBOLS

1 Axial rolling bearing
2 Bearing disc
3 Arched raceway
4 Rolling element
5 End of 4
6 End of 4
7 Outer surface of 4
8 End face of 4
9 End face of 4
10 Logarithmically sloping section
11 Logarithmically sloping section
12 Rounded portion
13 Rounded portion
14 Bearing cage
15 Depression
16 Depression
17 Transition from 15 to 3
18 Transition from 16 to 3
19 Second bearing disc
$a_1$ Depth of 15
$a_2$ Depth of 16
$b_1$ Width of 15
$b_2$ Width of 16
$r_1$ Inner radius of 15

$r_2$ Outer radius of 16
d Diameter of 4
t Material thickness of 2
$x_0$ Distance measure
$x_2$ Distance measure

The invention claimed is:
1. An axial rolling bearing, comprising:
an annular bearing disc, which has an arched raceway arched in profile cross section; and
a multiplicity of rolling elements formed as bearing needles or bearing rollers and arranged next to one another in a circular form, which roll on the arched raceway of the bearing disc and are kept at uniform distances from one another by a bearing cage
wherein, in a region of one of two ends of the rolling elements, the arched raceway has at least one circumferential groove-shaped depression.

2. The axial rolling bearing according to claim 1, wherein the arched raceway is formed with a radially inner groove-shaped depression at a radially inner end of the rolling elements and a radially outer groove-shaped depression at a radially outer end of the rolling elements, a maximum depth of the groove-shaped depression in each case is between 0.1% and 15% of a material thickness of the bearing disc.

3. The axial rolling bearing according to claim 2, wherein an inner radius of the radially outer groove-shaped depression is equal to a distance between an outer end face of the rolling elements and an axis of rotation of the axial rolling bearing minus a distance measure which is between 5% and 45% of a diameter of the rolling elements.

4. The axial rolling bearing according to claim 2, wherein an outer radius of the radially inner groove-shaped depression is equal to a distance between an inner end face of the rolling elements and an axis of rotation of the axial rolling bearing plus a distance measure which is between 5% and 45% of a diameter of the rolling elements.

5. The axial rolling bearing according to claim 2, wherein a width of the groove-shaped depressions is at least 5% of a diameter of the rolling elements.

6. The axial rolling bearing according to claim 2, wherein respective transitions of the groove-shaped depressions to the arched raceway in a rolling region between the two ends of the rolling elements have a rounded contour.

7. The axial rolling bearing according to claim 1, wherein the rolling elements in the region of the two ends thereof additionally have a transition profile of an outer surface thereof to end faces thereof reducing the diameter thereof.

8. The axial rolling bearing according to claim 7, wherein the transition profile at the ends of the rolling elements is formed in each case by a logarithmically sloping section in the profile cross section and by rounded portions connecting thereto and ending on the end faces of the rolling elements.

9. The axial rolling bearing according to claim 8, wherein the transitions from the outer surfaces to the logarithmically sloping sections and from the logarithmically sloping sections to the rounded portions at the ends of the rolling elements are formed in an edge-free manner.

10. The axial rolling bearing of claim 9 wherein the rounded portions at the ends of the rolling elements are formed with a constant curvature.

11. The axial rolling bearing according to claim 1, further comprising a second annular bearing disc having a second arched raceway arched in profile cross section wherein, in a region of the two ends of the rolling elements, the second arched raceway has circumferential groove-shaped depressions.

\* \* \* \* \*